(12) United States Patent
Suzuki (10) Patent No.: US 8,606,129 B2
(45) Date of Patent: Dec. 10, 2013

(54) IMAGE FORMING SYSTEM AND IMAGE FORMING APPARATUS FOR DETECTING POSITION DEVIATION AND DENSITY DEVIATION

(75) Inventor: Nobuhiko Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 179 days.

(21) Appl. No.: 13/015,826

(22) Filed: Jan. 28, 2011

(65) Prior Publication Data
US 2011/0182602 A1 Jul. 28, 2011

(30) Foreign Application Priority Data
Jan. 28, 2010 (JP) .................................. 2010-016721

(51) Int. Cl.
*G03G 15/00* (2006.01)
(52) U.S. Cl.
USPC ............... 399/49; 399/72; 399/301; 347/117; 358/1.9
(58) Field of Classification Search
USPC ........................................................ 399/49
See application file for complete search history.

(56) References Cited

U.S. PATENT DOCUMENTS

| | | | | |
|---|---|---|---|---|
| 5,767,978 | A * | 6/1998 | Revankar et al. | 358/296 |
| 5,950,036 | A * | 9/1999 | Konishi | 399/8 |
| 6,057,866 | A * | 5/2000 | Haneda et al. | 347/118 |
| 6,101,000 | A * | 8/2000 | Murray et al. | 358/1.9 |
| 6,163,327 | A * | 12/2000 | Mori et al. | 347/115 |
| 6,253,047 | B1 * | 6/2001 | Hildebrand et al. | 399/167 |
| 6,871,026 | B2 * | 3/2005 | Shimura et al. | 399/12 |
| 6,915,087 | B2 * | 7/2005 | Furno et al. | 399/49 |
| 7,440,706 | B2 * | 10/2008 | Moriyama et al. | 399/43 |
| 7,598,971 | B2 * | 10/2009 | Tezuka et al. | 347/116 |

(Continued)

FOREIGN PATENT DOCUMENTS

| | | | |
|---|---|---|---|
| CN | 101221404 A | | 7/2008 |
| JP | 2000-155453 A | | 6/2000 |

(Continued)

OTHER PUBLICATIONS

English machine translation of Japanese patent document Yoshida (JP 2005181534A); by Yoshida, Seiji; published Jul. 7, 2005; "Image Forming System, Information Processor, Program, and Image Forming Apparatus".*

(Continued)

*Primary Examiner* — David Gray
*Assistant Examiner* — Geoffrey Evans
(74) *Attorney, Agent, or Firm* — Baker Botts L.L.P.

(57) ABSTRACT

An image forming system is provided. The image forming system includes an image forming apparatus configured to form a mark for detecting at least one of a position deviation and a density deviation and obtains a correction amount by detecting the mark, the image forming system comprising: an identification unit configured to identify an image characteristic of an image to be printed according to at least one of a positional relationship between colors, a gradation distribution and a resolution, and a selecting unit configured to select a choice from multiple choices containing at least two choices of: only position deviation; only density deviation; and both position deviation and density deviation, according to the image characteristic identified by the identification unit, wherein the image forming apparatus is configured to form the mark for obtaining the correction amount according to the choice selected by the selecting unit.

16 Claims, 5 Drawing Sheets

(56) References Cited

U.S. PATENT DOCUMENTS

| | | | |
|---|---|---|---|
| 7,652,791 B2 * | 1/2010 | McCarthy et al. | 358/1.9 |
| 7,962,054 B2 * | 6/2011 | Nakazato et al. | 399/31 |
| 7,965,407 B2 * | 6/2011 | Yoshida | 358/1.16 |
| 8,078,069 B2 * | 12/2011 | Otsuka et al. | 399/49 |
| 8,130,409 B2 * | 3/2012 | Itagaki et al. | 358/1.2 |
| 8,213,057 B2 * | 7/2012 | Kabashima | 358/3.27 |
| 8,238,776 B2 * | 8/2012 | Kim | 399/72 |
| 8,340,552 B2 * | 12/2012 | Maehata et al. | 399/167 |
| 8,422,070 B2 * | 4/2013 | Yamauchi | 358/1.9 |
| 2001/0031148 A1 | 10/2001 | Kajiwara et al. | |
| 2001/0043258 A1 | 11/2001 | Ohki | |
| 2004/0033085 A1 * | 2/2004 | Misaizu et al. | 399/130 |
| 2004/0096231 A1 * | 5/2004 | Furno et al. | 399/49 |
| 2004/0202496 A1 * | 10/2004 | Iwasaki | 399/167 |
| 2005/0007609 A1 * | 1/2005 | Itagaki et al. | 358/1.9 |
| 2005/0089340 A1 * | 4/2005 | Yamamoto | 399/49 |
| 2005/0151985 A1 * | 7/2005 | Hisamura | 358/1.12 |
| 2006/0017795 A1 | 1/2006 | Nomura et al. | |
| 2007/0237529 A1 * | 10/2007 | Katou | 399/9 |
| 2008/0075488 A1 * | 3/2008 | Moriyama et al. | 399/43 |
| 2008/0101807 A1 * | 5/2008 | Burry et al. | 399/50 |
| 2008/0144067 A1 * | 6/2008 | Burry et al. | 358/1.13 |
| 2008/0166147 A1 * | 7/2008 | Kim | 399/39 |
| 2008/0170250 A1 | 7/2008 | Kitagawa et al. | |
| 2009/0035029 A1 | 2/2009 | Kobayashi | |
| 2009/0284770 A1 | 11/2009 | Nagayama et al. | |
| 2012/0163842 A1 * | 6/2012 | Murayama | 399/49 |
| 2012/0237232 A1 * | 9/2012 | Goto | 399/49 |
| 2012/0257224 A1 * | 10/2012 | Sasaki | 358/1.9 |
| 2013/0084109 A1 * | 4/2013 | Shikama et al. | 399/301 |
| 2013/0156451 A1 * | 6/2013 | Hano | 399/49 |

FOREIGN PATENT DOCUMENTS

| | | | |
|---|---|---|---|
| JP | 2001-272835 A | 10/2001 | |
| JP | 2005-181534 A | 7/2005 | |
| JP | 2006-035552 A | 2/2006 | |
| JP | 2007-065377 A | 3/2007 | |
| JP | 2009-053668 A | 3/2009 | |

OTHER PUBLICATIONS

European Patent Office, extended European Search Report for European Patent Application No. 11250071.5 (counterpart to above-captioned patent application), mailed Feb. 24, 2012.

Japan Patent Office, Notification of Reason for Refusal for Japanese Patent Application No. 2010-016721 (counterpart to above-captioned patent application), dispatched Nov. 22, 2011.

The State Intellectual Property Office of the People's Republic of China, Notification of First Office Action for Chinese Patent Application No. 201110033069.0 (counterpart Chinese patent application), issued Apr. 18, 2013.

European Patent Office, Office Action for European Patent Application No. 11250071.5 (counterpart to above-captioned patent application), mailed Jun. 7, 2013.

* cited by examiner

IMAGE FORMING SYSTEM AND IMAGE FORMING APPARATUS FOR DETECTING POSITION DEVIATION AND DENSITY DEVIATION

CROSS-REFERENCE TO RELATED APPLICATIONS

This application claims priority from Japanese Patent Application No. 2010-016721 filed on Jan. 28, 2010, the entire contents of which are incorporated herein by reference.

TECHNICAL FIELD

Aspects of the present invention relates to an image forming system that comprises an image forming apparatus that forms a mark used for image adjustment and an information processing apparatus that sends print data to the image forming apparatus.

BACKGROUND

A related-art image forming apparatus performs image adjustment to prevent producing position and density deviation of an image. As an example of a procedure of the image adjustment, the image forming apparatus forms a resist pattern that is a mark used for the position adjustment for each color, obtains a deviation amount (correction amount) between the resist pattern of a basic color and the resist pattern of a test color, and corrects the position deviation of the image of the test color according to the correction amount. In addition, for example, the image forming apparatus forms a density pattern which is a mark used for the density adjustment, obtains a deviation amount (correction amount) between the density of the density pattern and a target density, and corrects the density deviation of the test color according to the correction amount.

However, it is well known that it takes time to obtain the correction amount used for the image adjustment, causing low printing efficiency. Furthermore, if the marks used for the image adjustment are frequently created, consumables (such as toner) will be wasted. In view of this problem, related-art discloses a technology in which whether the printing is monochrome printing or not is determined, and when it is determined that the printing is monochrome printing, the marks used for the image adjustment are not formed.

However, the related-art image forming apparatus has the following problems. That is, there are times when necessity to perform the image adjustment is low, even if the printing is color printing. For example, for text image data in which there are some red characters (not mixed with another color) among black characters, even if the image is a color image, the necessity to correct the position deviation and the density deviation is low. However, the related-art image forming apparatus forms the marks used for the image adjustment as long as the printing is color printing.

SUMMARY

Accordingly, it is an aspect of the present invention is to provide an image forming system and an image forming apparatus, which improve printing efficiency and prevent the waste of consumables.

According to an exemplary embodiment of the present invention, there is provided an image forming system including an image forming apparatus configured to form a mark for detecting at least one of a position deviation and a density deviation and obtains a correction amount by detecting the mark, the image forming system comprising: an identification unit configured to identify an image characteristic of an image to be printed according to at least one of a positional relationship between colors, a gradation distribution and a resolution, and a selecting unit configured to select a choice from multiple choices containing at least two choices of: only position deviation; only density deviation; and both position deviation and density deviation, according to the image characteristic identified by the identification unit, wherein the image forming apparatus is configured to form the mark for obtaining the correction amount according to the choice selected by the selecting unit.

According to another exemplary embodiment of the present invention, there is provided an image forming apparatus comprising: an obtaining unit configured to form a mark for detecting at least one of a position deviation and a density deviation and obtains a correction amount by detecting the mark, an identification unit configured to perform identification of an image characteristic of an image to be printed according to at least one of a positional relationship between colors, a gradation distribution and a resolution, and a selecting unit configured to select a choice from multiple choices containing at least two choices of: only position deviation; only density deviation; and both position deviation and density deviation, according to the image characteristic identified by the identification unit, wherein the obtaining unit is configured to form the mark for obtaining the correction amount according to the choice selected by the selecting unit.

DETAILED DESCRIPTION

Hereinafter, an exemplary embodiment in which an image forming apparatus and an image forming system of the present invention is implemented will be described in detail with reference to the drawings. The exemplary embodiment describes an image forming system, which includes a multi function peripheral (MFP) with a color printing function and a personal computer (PC) sending printing jobs to the MFP, as an example of the image forming system of the present invention.

Overall Configuration of the Image Forming System

Figure 1:
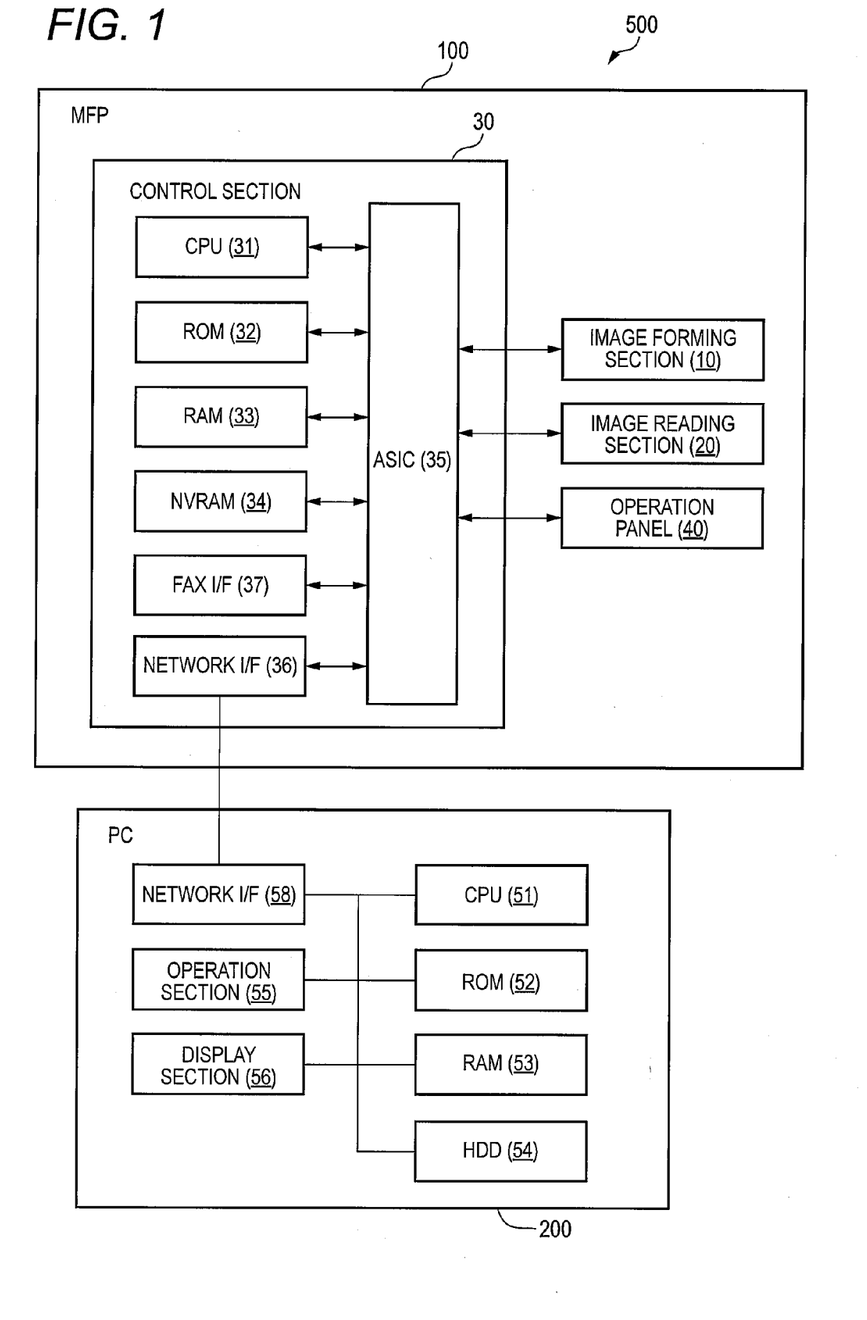
FIG. 1 is a block diagram showing a configuration of an image forming system of an exemplary embodiment of the present invention.

As shown in FIG. 1, an image forming system 500 of the exemplary embodiment includes a MFP 100 (an example of the image forming apparatus) equipped with a color printing function and a PC 200 connected to the MFP 100 through network. In the image forming system 500, a print job is sent from the PC 200 and printing according to the print job is performed in the MFP 100. In the image forming system 500, there can be several image forming apparatuses (the image forming apparatus is not limited to the MFP, and can be a printer, a copier, etc.) and PCs. Further, the image forming system 500 may also contain other information processing apparatuses (such as servers and scanners).

The Configuration of the MFP

Hereinafter, the schematic configuration of the MFP 100 will be described. The MFP 100 includes a control section 30. The control section 30 includes a Central Processing Unit (CPU) 31, a Read-Only Memory (ROM) 32, a Random Access Memory (RAM) 33, a nonvolatile RAM (NVRAM) 34, an Application Specific Integrated Circuit (ASIC) 35, a network interface 36 and a FAX interface 37. Further, the control section 30 is electrically connected to an image forming section 10 that forms images on sheets, an image reading section 20 that reads an image of a copy, and an operation panel 40 that displays operation status and receives operations input by a user.

Various control programs, settings, initial values, etc., are stored in the ROM 32 to control the MFP 100. The RAM 33 is used as a work area from which various control programs may be read, or is used as a storage area where image data is temporarily stored.

The CPU 31 stores the processing results in the RAM 33 or the NVRAM 34 according to the control programs read from the ROM 32 and signals sent from various sensors, and controls various elements of the MFP 100 via the ASIC 35.

The network interface 36 is connected to a network, to enable connection to the PC 200. The FAX interface 37 is connected to a telephone line, to enable connection to a FAX apparatus. Data transmission between an external apparatus can be carried out through the network interface 36 and the FAX interface 37.

Configuration of the PC

Hereinafter, the schematic configuration of the PC 200 will be described. The PC 200 includes a CPU 51, a ROM 52, a RAM 53, a Hard Disc Drive (HDD) 54, an operating section 55 including a keyboard and a mouse, a display section 56 including a liquid crystal display, and a network interface 58.

Further, the HDD 54 of the PC 200 includes an operating system (OS), a device driver controlling various devices, an application program including a print instruction function, etc.

Configuration of the Image Forming Section of the MFP

Figure 2:
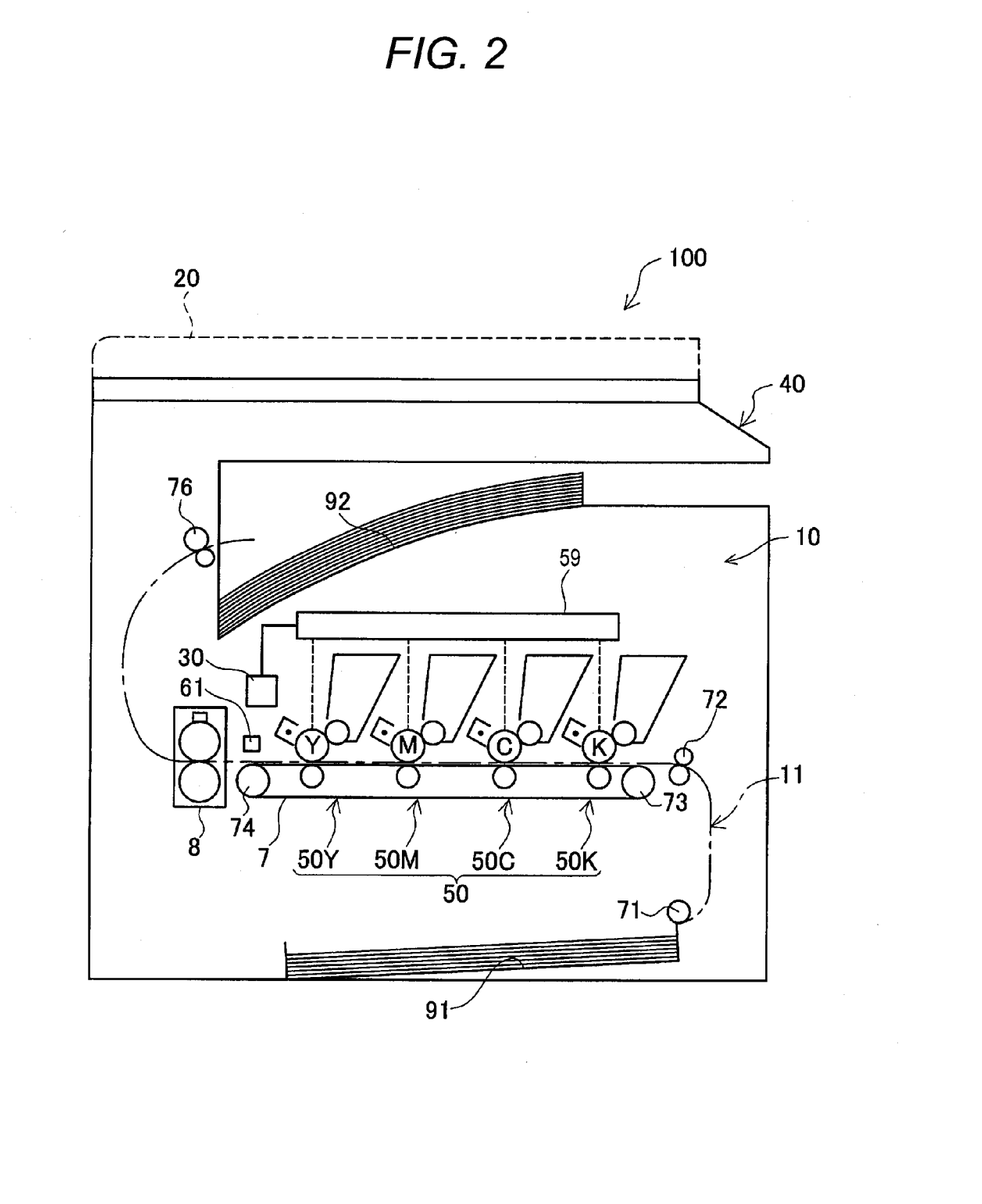
FIG. 2 is a schematic drawing showing a configuration of an image forming section of a MFP.

Hereinafter, the configuration of the image forming section 10 of the MFP 100 will be described with reference to FIG. 2. The image forming section 10 forms a toner image by electronic photography. The image forming section 10 includes a processing section 50 that transfers the toner image on the sheets, a fixing apparatus 8 that fixes the unfixed toner on the sheets, a paper feeding tray 91 that carries the sheets before the image is transferred, and a paper discharging tray 92 that carries the sheets after the image is transferred. The image reading section 20 is provided upper than the image forming section 10.

In the image forming section 10, an S-shaped transport path 11 (the dashed line in FIG. 2), via which the sheets placed in the paper feeding tray 91 that is located at a bottom portion of the image forming section 10 are conveyed to the paper discharging tray 92 located at a top portion of the image forming section 10, is formed. The transport path includes a paper feeding roller 71, a registration roller 72, the processing section 50, the fixing apparatus 8, and a paper discharging roller 76.

The processing section 50 is capable of forming a color image, and includes processing sections corresponding to yellow (Y), magenta (M), cyan (C) and black (K) which are arranged respectively in parallel. Specifically, the processing section 50 includes a processing section 50Y forming a yellow image, a processing section 50 M forming a magenta image, a processing section 50C forming a cyan image and a processing section 50K forming a black image. The processing sections 50Y, 50M, 50C and 50K are arranged at a certain distance from each other along the conveying direction of the sheets.

In the processing section 50, the surface of a photoconductor is uniformly charged by a charging apparatus. Then, the surface of the photoconductor is exposed to the light from an exposure apparatus 59, and an electrostatic latent image of the image to be formed on the sheets is formed. Next, toner is supplied to the photoconductor through a developing apparatus. Thereby, the electrostatic latent image on the photoconductor is visualized as toner image.

The image forming section 10 includes an exposure apparatus 59 that irradiates light to each processing section 50Y, 50M, 50C and 50K, a conveyor belt 7 that conveys the sheets to the transfer position of each processing section 50Y, 50M, 50C and 50K, and a mark sensor 61 that detects the resist patterns formed on the conveyor belt 7.

The conveyor belt 7 is an endless belt member that is stretched by conveyor rollers 73 and 74. The conveyor belt 7 is made of resin, such as polycarbonate. The conveyor belt 7 moves circularly in a counterclockwise direction in FIG. 2 by rotationally driving the conveyor roller 74. The sheets placed on the belt 7 are thereby conveyed from the registration roller 72 to the fixing apparatus 8.

The image forming section 10 removes the sheets placed on the paper feeding tray 91 one by one, and conveys the sheet to the conveyor belt 7. The toner image formed on the processing section 50 is transferred to the sheet on the belt conveyor 7. In this case, when the printing is color printing, the toner image is formed on each processing section 50Y, 50M, 50C, and 50K. Each toner image is overlapped on the sheet. On the other hand, when the printing is monochrome printing, the toner image is only formed on the processing section 50K, and is transferred to the sheet. After that, the sheet to which the toner image is transferred is conveyed to the fixing apparatus 8, and the toner image is thermally fixed on the sheet. Then, the fixed sheet is discharged from the paper discharging tray 92.

The mark sensor 61 is located downstream from the processing section 50Y, 50M, 50C and 50K, and upstream from the fixing apparatus 8. The mark sensor 61 detects the pattern used for the image adjustment, which is formed on the conveyor belt 7.

Figure 3:
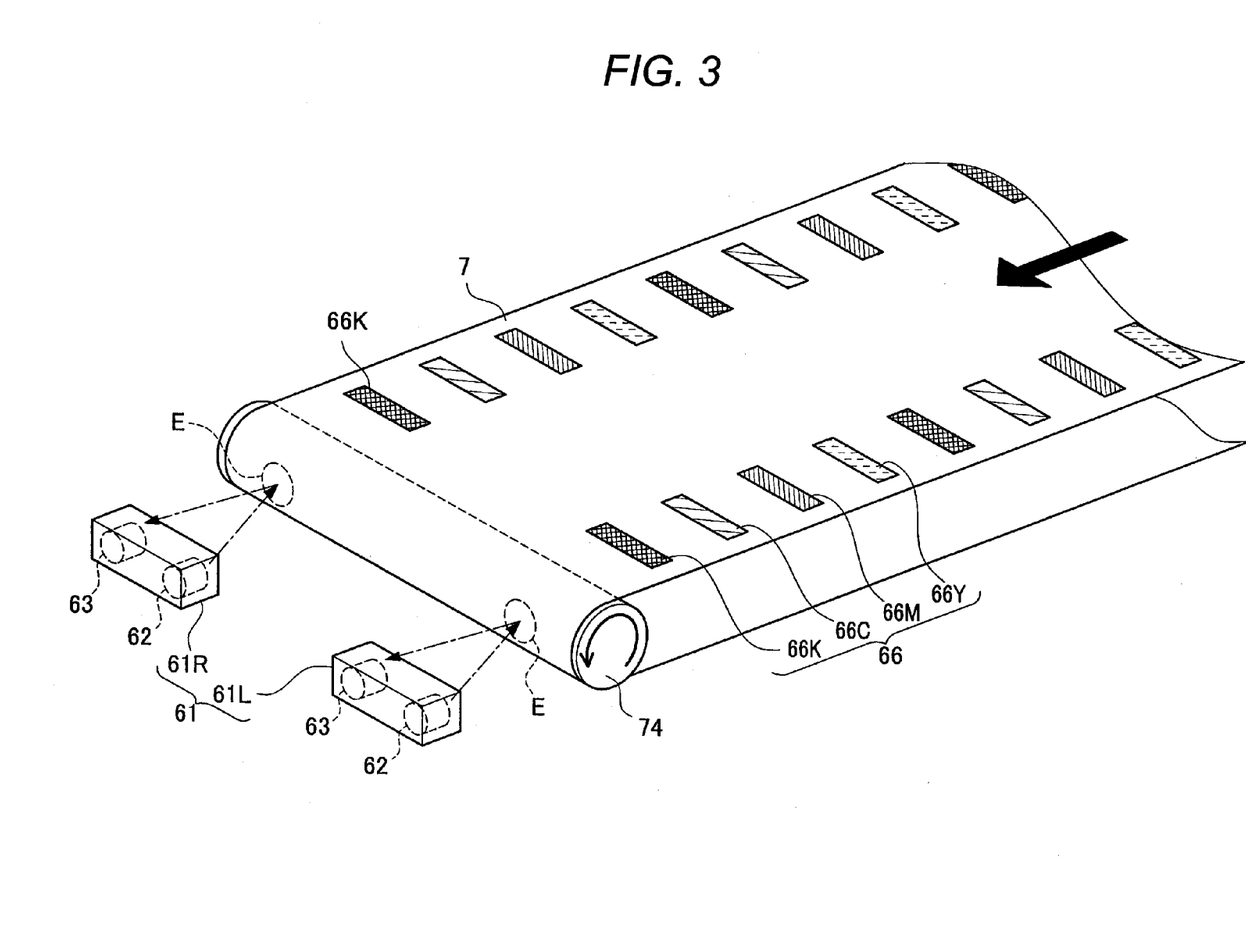
FIG. 3 is a conceptual drawing showing a configuration of a mark sensor of the MFP shown in FIG. 2.

Specifically, as shown in FIG. 3, the mark sensor 61 is composed of two sensors, a sensor 61R located on the right side of the width direction of the conveyor belt 7, and a sensor 61L located on the left side of the width direction of the conveyor belt 7. Each sensor 61R and 61L is a reflective optical sensor which is a pair of a light emitting apparatus 62 (such as LED) and a light receiving apparatus 63 (such as phototransistor). In the mark sensor 61, the light emitting apparatus 62 irradiates the light from the diagonal direction with respect to the surface of the conveyor belt 7 (dotted frame E in FIG. 3), and the light receiving apparatus 63 receives the light. A mark used for the image adjustment can be detected according to the difference between the amount of light received when the mark used for the image adjustment 66 passes through and the amount of light directly received from the conveyor belt 7.

Image Adjustment of the MFP

Hereinafter, the image adjustment of the MFP 100 will be described. As the image adjustment, in the MFP 100, the position deviation correction to adjust the image position of each color and the density deviation correction to adjust the density of each color are performed.

Hereinafter, the image adjustment will be briefly described by taking the position deviation correction for example. The position deviation correction can be divided into an obtaining process for obtaining the deviation amount (correction value) from a standard color, for each color, and a correction process for correcting the image according to the correction value. The obtaining process is, for example, executed according to an instruction from the print execution process described later. The correction process is, for example, executed each time when printing is performed.

In the obtaining process, first, a resist pattern which is an image pattern used for the position deviation correction is formed by each processing section 50Y, 50M, 50C and 50K. Specifically, as shown in FIG. 3, the resist pattern includes a mark group. The mark group includes a mark 66K formed by the processing section 50K, a mark 66C formed by the processing section 50C, a mark 66M formed by the processing section 50M, and a mark 66K formed by the processing section 50K, which are arranged side by side in a sub-scanning direction. The mark group is hereinafter referred to as resist pattern 66".

The resist pattern 66 is formed at regular intervals along the sub-scanning direction (moving direction of the conveyor belt 7 shown in FIG. 3). Each mark 66K, 66C, 66M and 66Y of the exemplary embodiment is a square bar shape, and is provided in a main scanning direction (the direction perpendicular to the sub-scanning direction).

Position of each mark 66K, 66Y, 66M and 66C is detected based on binary signals output from the mark sensor 61. The interval between each mark of the adjusting colors (such as marks 66C, 66M and 66Y) and the mark of the standard color (such as mark 66K) in the sub-scanning direction can thus be calculated. The interval between the mark of the standard color and the mark of the adjusting color changes according to the position deviation in the sub-scanning direction. Therefore, the deviation amount between the adjusting color and the standard color in the sub-scanning direction can be specified.

In the correction process, the process conditions (for example, exposure position, and speed of the conveyor belt 7 and the photoconductor) of the adjusting color is adjusted according to the deviation amount obtained in the obtaining process, so that the image position of the adjusting color and the image position of the standard color match with each other.

The above-described configuration of the resist pattern 66 is merely an example, and the present invention is not limited by the configuration. A common image pattern that is used in a position deviation correction can also be used as the resist pattern 66. For example, an image pattern including a pair of bar-shaped marks, at least one of which inclines in a predetermined angle with respect to the line along the main scanning direction, can be used as the resist pattern. By using the above-described image pattern as the resist pattern, the position deviation amount of both the sub-scanning direction and the main scanning direction can be specified.

The density deviation correction is similar to the position deviation correction. The density deviation correction is divided into an obtaining process that obtains a correction amount relative to a predetermined density, and a correction process that corrects the image according to the correction value. In the obtaining process, a density pattern which is an image pattern with density difference in the sub-scanning direction is formed by each processing section 50Y, 50M, 50C and 50K. The amount of light reflected from the density pattern is detected by a sensor. The sensor may be the sensor used for the position deviation correction or it may be another sensor. For example, in the exemplary embodiment, the amount of light reflected from the density pattern is detected by the sensor 61L. The density is specified from the amount of the reflected light, and the difference between the density and the target density is calculated as the correction value. In the correction process, the processing conditions of each color (such as exposure intensity, exposure range, and developing bias) are adjusted according to the correction value, so as to maintain the target density.

Management Operation of the Image Adjustment of the Image Forming System

Hereinafter, the procedure of the image adjustment in the image forming system 500 will be described. In the image forming system 500, the correction type which needs image adjustment is determined, and then, the obtaining process for each correction is performed according to the determination. Hereinafter, the process to execute the above operations will be described by dividing the process into a process by the PC 200 and a process by the MFP 100.

Correction Type Determination Process

Figure 4:
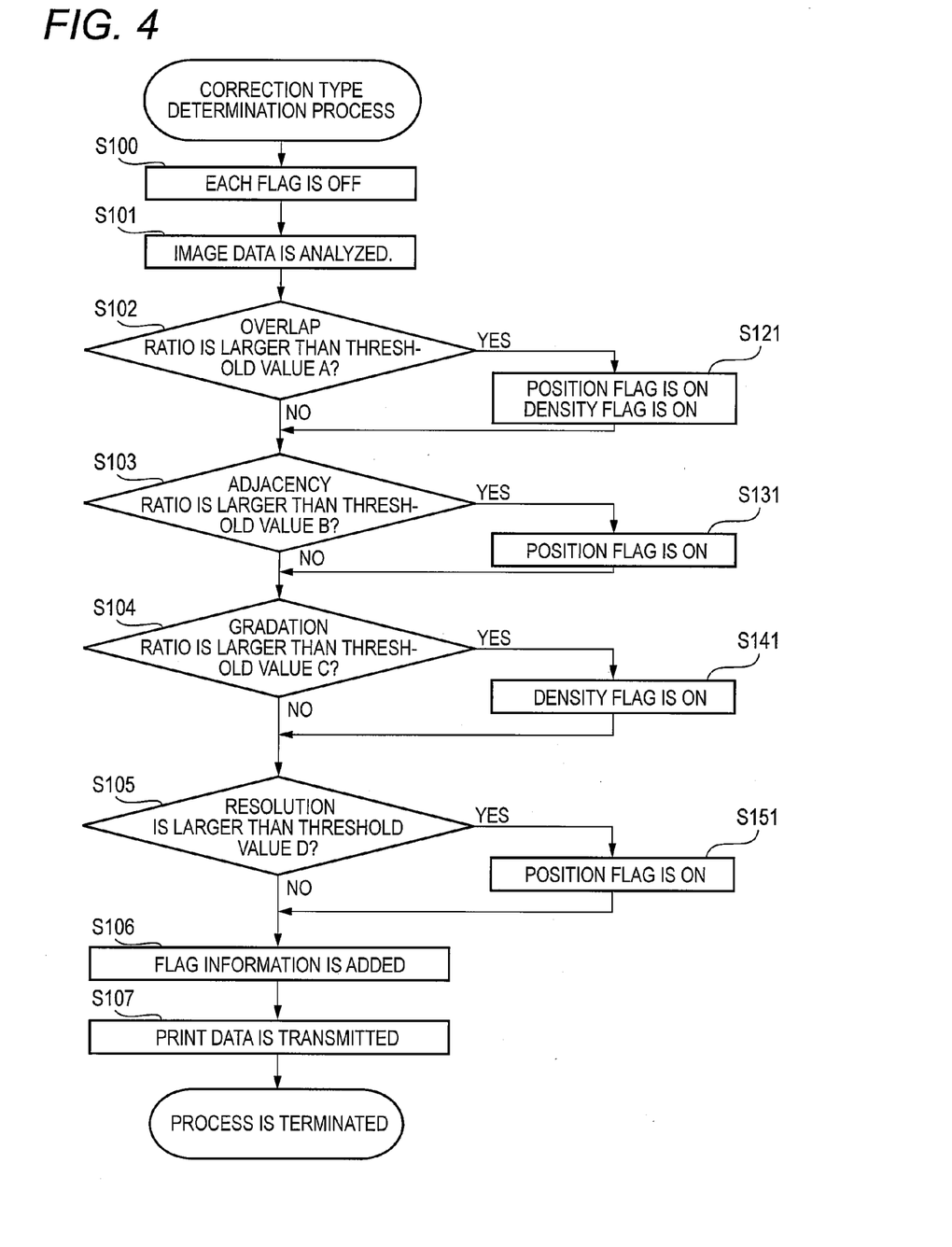
FIG. 4 is a flowchart showing a procedure of correction type determination process of a PC.

First, as a process executed by the PC 200, the procedure of the correction type determination process (an example of identification unit and selection unit) that determines the correction type which needs the image adjustment will be described with reference to the flowchart shown in FIG. 4. The correction type determination process is performed by a printer driver included in the PC 200. The correction type determination process is executed when the print instruction is received by the printer driver.

First, various flags storing the correction types which need the image adjustment is turned off (S100). In the exemplary embodiment, the correction type includes the position deviation correction and the density deviation correction, and a flag is provided for each correction type. Furthermore, a flag is provided between each colors (between cyan and magenta, between cyan and yellow, between cyan and black, between magenta and yellow, between magenta and black, and between yellow and black) in the position deviation correction, and a flag is provided for each color (cyan, magenta, yellow, black) in the density deviation correction. The initial state of each flag is off. When the correction is determined to be necessary according to image analysis results which will be described later, the initial state "off" changes to "on".

Next, the image characteristic of the image data to be printed is analyzed for each print page (S101). In S101, at least the overlap ratio between colors, the adjacency ratio between colors and the gradation ratio are required. Each ratio will be described later in detail.

Next, according to the analysis results in S101, whether the position deviation correction and the density deviation correction are necessary is determined (S102, S103, S104 and S105). In the exemplary embodiment, the following four items of the image properties are determined.

First, whether the ratio of an area having color overlap is larger than a threshold value A is determined (S102). The area having the color overlap means an area including a color mixture of at least two colors. Whether the ratio of the area having such color overlap in a single page is large or not is determined. The determination may also be performed based on the number of the pixels of the mixed area. The area having the color overlap may be limited to areas including a color mixture of three colors or more. The ratio may be a ratio of a color mixture that can be easily identified by human eyes, which is previously set.

When the ratio of the area having the color overlap is larger than the threshold value A (S102 is YES), the flag used for the position deviation correction and the flag used for the density deviation correction are both turned on (S121). This is because, when the color mixture formed by overlapping the colors is output, if the colors don't overlap at the exact position, the output image will become unnatural. Further, if the density is not the exact density, the desired color will not be output. Therefore, the high accuracy of both the position and the density is required. Meanwhile, because each flag is prepared so as to correspond to each color, the flags corresponding to the colors of the color mixture are turned on. For example, when the overlap area of cyan and magenta is determined to be large, the flag for the position deviation correction between cyan and magenta and the flags for the density deviation correction of cyan and magenta are turned on.

Second, whether the ratio of a contact area between different colors is larger than a threshold value B is determined (S103). The contact between different colors means, for example, when a cyan color portion and a magenta color portion contact with each other in a round graph. Whether the length of the border generated by the contact between colors is large or not is determined.

When the ratio of the contact area between different colors is larger than the threshold value B (S103 is YES), the flag for the position deviation correction is turned on (S131). This is because, when different colors contact each other, if the contact is not at the exact position, the border of the colors becomes unclear. Thus, high accuracy in position is required. Meanwhile, even if the density accuracy is low, the difference in colors can be identified. Therefore, high accuracy in density is not required. Only the flag corresponding to the adjacent colors is turned on. For example, when the adjacency between cyan and magenta is determined to be high, the flag for the position deviation correction between cyan and magenta is turned on.

Third, whether the ratio of an area in which the color density changes gradually (gradation) is larger than the threshold value C is determined (S104). For example, the gradation can be determined according to a length of a continuous image pixel, wherein density variation (0-255) between adjacent image pixels included in the continuous image pixel is small. This is because, in the gradation area, because the density variation between the adjacent image pixels is small, and because such image pixels become a continuous state, the gradation area can be distinguished from a non-gradation area. The determination may also be performed based on whether the ratio of the gradation area in a single page is large or not.

When the ratio of the gradation area is larger than the threshold value C (S104 is YES), the flag for the density deviation correction is turned on (S141). This is because, when expressing the gradation, slight density change can not be expressed without exact density. Thus, the high accuracy of the density is required. Only the flag corresponding to the color forming the gradation is turned on. For example, when there are many cyan gradations, the flag for cyan density deviation correction is turned on.

Fourth, whether the resolution is larger than the threshold value D is determined (S105). When the resolution is larger than the threshold value D (S105 is YES), the flag for the position deviation correction is turned on (S151). This is because, for example, in a vector image file of the postscript, etc., the higher the resolution is, the higher the accuracy of the position of the print object is required. If the image to be printed is not a vector image file or a vector image file but position is not specified, it is not necessary to perform the determination of S105.

The correction types which need the image adjustment are determined by S102, S103, S104 and S105. That is, when the flag for the position deviation correction and the flag for the density deviation correction are both on, the position deviation correction and the density deviation correction are both needed to be performed. When the flag for the position deviation correction is on while the flag for the density deviation correction is off, only the position deviation correction is needed to be performed. When the flag for the position deviation correction is off while the flag for the density deviation correction is on, only the density deviation correction is needed to be performed. Meanwhile, when the flag for the position deviation correction and the flag for the density deviation correction are both off, both the position deviation correction and the density deviation correction are not performed.

The processing order of S102, S103, S104, and S105 is not limited to the above-described processing order. That is, the processing order is not important. Further, not all of the four items need to be performed, but at least one needs to be performed.

After the position deviation correction or the density deviation correction is determined, the information of the flag for the position deviation correction and the flag for the density deviation correction are added to the print data (S106). Next, the print data with the two flag information is sent to the MFP 100 (S107). After S107, the process is terminated.

Accordingly, the PC 200 determines whether the position deviation correction and the density deviation correction are necessary according to the image to be printed. Specifically, in the exemplary embodiment, the image characteristic of the image to be printed is identified, and whether both the position deviation correction and the density deviation correction are necessary, whether only the position deviation correction is necessary, whether only the density deviation correction is necessary, and whether neither the position deviation correction nor the density deviation correction is necessary, is determined. Then, the adjustment results are sent to the MFP 100.

Print Execution Process

Figure 5:
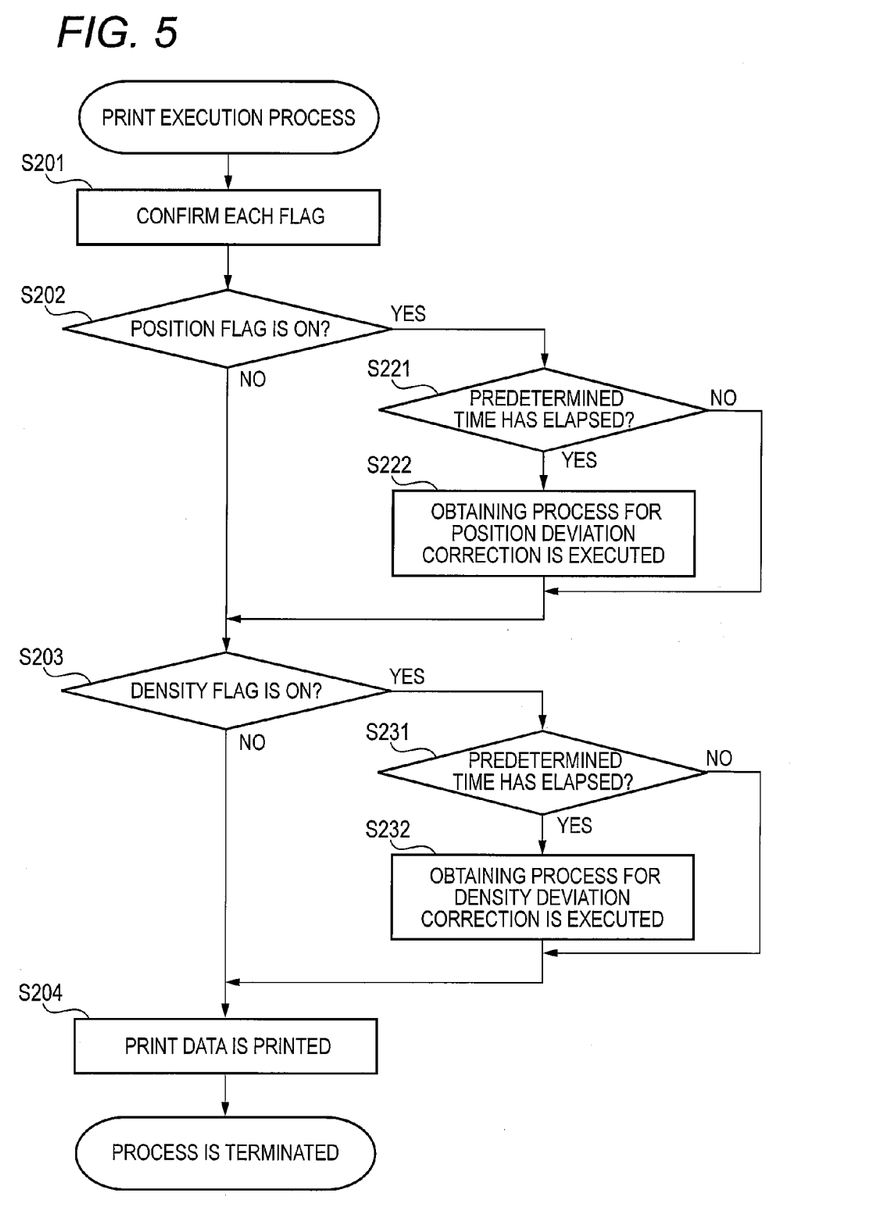
FIG. 5 is a flowchart showing a procedure of print execution process of the MFP.

Hereinafter, as a process executed by the MFP 100, the procedure of the print execution process (an example of the determination unit) that determines the execution of the obtaining process used for the image adjustment will be described with reference to the flowchart shown in FIG. 5. The print execution process is executed each time the print data is received.

First, the flag information added to the print data is confirmed (S201). Next, the on-off state of each flag is determined according to the flag information (S202, S203).

Specifically, whether the flag for the position deviation correction is on is determined (S202). In S202, if at least one of the flags for the position deviation correction between each group of colors is on, the on state is determined. When the flag for the position deviation correction is on (S202 is YES), whether a predetermined time has elapsed since the previous obtaining process for the position deviation correction was executed is determined (S221). If the predetermined time has elapsed (S221 is YES), the obtaining process is executed for each group of colors that the corresponding flags for the position deviation correction are on (S222). Meanwhile, if the predetermined time has not elapsed (S221 is NO), the obtaining process for the position deviation correction is not executed. This is because, when only a short time has elapsed since the previous obtaining process was executed, it is unlikely that the image quality changes significantly. Further, in the obtaining process, toner for is consumed for purpose other than printing, leading to low productivity. Therefore, when the predetermined time has not elapsed since the previous obtaining process for the position deviation correction was executed, the obtaining process is not executed due to the priority in effective use of toner and productivity.

Next, whether the flag for the density deviation correction is on is determined (S203). In S203, if at least one of the flags for the density deviation correction of each color is on, the on state is determined. When the flag for the density deviation correction is on (S203 is YES), whether a predetermined time has elapsed since the obtaining process for the density deviation correction was executed is determined (S231). If the predetermined time has elapsed (S231 is YES), the obtaining process is executed for each color that the corresponding flags for the density deviation correction are on (S232). Meanwhile, if the predetermined time has not elapsed (S231 is NO), the obtaining process for the density deviation correction is not executed.

The processing order of S202 and S203 is not limited to the above-described processing order. That is, the processing order may be reversed. Further, when the obtaining process is being executed in S222 or S232, the next process will not be performed. In the exemplary embodiment, flag determination and image deterioration determination are executed in this order. However, this order can be reversed. After the flag determination, the print data is printed (S204). After S204, the process is terminated.

According to the above-described correction type determination process and the print execution process, even if the image to be printed is a color image, the obtaining process for each correction is not performed at times. For example, if a text image in which there are some red characters among black characters is the image to be printed, it is considered that the color overlap is low. In this case, the obtaining process of the position deviation correction and the obtaining process of the density deviation correction can be avoided. Further, for example, in an image only including characters and charts, the gradation ratio may be small. In this case, the obtaining process of the density deviation correction can be avoided.

As described above in detail, the image forming system 500 identifies the image characteristic of the image to be printed, and forms necessary marks according to the image characteristic. Specifically, according to the positional relationship of the colors, gradation distribution and resolution of the image to be printed, the image forming system of the invention identifies whether high accuracy in image position is required, or whether high accuracy in density is required, and forms the marks corresponding to the required accuracy. Therefore, it is possible to avoid forming marks whose necessity is low. Thus, the reduction in productivity, due to forming marks whose necessity to perform the image adjustment is low, can be expected to be avoided.

While the present invention has been shown and described with reference to the exemplary embodiment, the present invention is not limited to the exemplary embodiment. Various improvements and variations can be made without departing from the spirit and scope of the invention. For example, the image forming apparatus is not limited to the MFP, but can also be applied to apparatuses with print functions such as a printer and a copier.

In addition, although an MFP with a color printing function is provided in the exemplary embodiment, the image forming apparatus of the present invention is not limited to a color printing apparatus. For example, the image forming apparatus can be applied to a monochrome printing apparatus, if the monochrome printing apparatus can form marks to perform the position deviation correction and the density deviation correction.

In addition, although an image forming apparatus forming marks on the paper transport belt is provided in the exemplary embodiment, the present invention is not limited to this. For example, even if the image forming apparatus is an image forming apparatus with an intermediate transfer belt, the present invention can be applied when forming marks on the intermediate transfer belt.

In addition, in the exemplary embodiment, although the PC 200 performs the image analysis and determines whether the position deviation correction and the density deviation correction are performed according to the results, the image analysis and the correction type determination can also be performed by the MFP 100. That is, the correction type determination process of FIG. 4 can be performed by the MFP 100. In this case, in S107, print data with the flag information is sent to the image forming section 10. Further, when the PC 200 sends the print data to the MFP 100 through a server, the correction type determination process of FIG. 4 can be performed by the server.

In addition, in the exemplary embodiment, although the image analysis is performed for each print page, the image analysis can be performed for each print job (multiple pages).

In addition, in the exemplary embodiment, although the flags are prepared for each group of colors each color, the present invention is not limited to this. For example, the flag can be prepared for each correction type. In this case, if the position deviation correction between different colors is determined to be necessary for at least one of the group of colors, the obtaining processes for the position deviation correction is performed for all of the groups of colors. Further, if the density deviation corrections of the colors is determined to be necessary for at least one color, the obtaining processes for the density deviation correction is performed for all of the colors.

In addition, in the exemplary embodiment, although the image deterioration is determined just before the obtaining process is executed (S221, S231), the present invention is not limited to this. For example, the image deterioration can be determined before the flag information is confirmed (S201). Further, if the PC 200 can obtain the image quality of the MFP 100 (for example, obtain the printed number), the image quality deterioration may be determined by the PC 200. In the case, the image characteristic may be analyzed only when the image quality deterioration is determined.

In addition, in S221 and S231, although the elapsed time since the previous obtaining process was executed is used as a condition to determine the image quality deterioration, the present invention is not limited to this. For example, the print number and the used amount of toner since the previous obtaining process was executed can be used as the condition. Environmental conditions such as temperature change and moisture change can also be used.

In addition, in the exemplary embodiment, although the MFP 100 receives the flag information and determines whether the obtaining process of each correction is to be executed according to the flag information, the invention is not limited to this. For example, the PC 200 may add various ratios, which are used in the determination in the correction type determining processes S102, S103, S104 and S105, to the print data, and then the MFP 100 may determine executing the obtaining process of each image adjustment according to the ratios.

In addition, in the exemplary embodiment, although whether to execute the obtaining process for each correction is determined by the state of the flag, a necessary factor for each correction, which is a required degree of the correction according to the image analysis results, may be prepared (for example, the initial value is zero, and the more necessary the correction according to the image analysis results, the larger the value. Or, the initial value is maximum, and the more necessary the correction is according to the image analysis results, the less the value). The execution of the obtaining process may be determined by comparing the factor with a threshold value. Further, the threshold value can be changed depending on the image quality deterioration.

In addition, in the exemplary embodiment, although the density deviation correction is determined by the gradation ratio, it can also be determined by frequency distribution of gradation used in the image. For example, among the gradations expressed by 0 to 255, when the used gradation number is larger than a threshold value, the flag of the density deviation correction may be turned on.

What is claimed is:

1. An image forming system including an image forming apparatus configured to form a mark for detecting at least one of a position deviation and a density deviation and obtain a correction amount by detecting the mark, the image forming system comprising:
an identification unit configured to identify an image characteristic of an image to be printed according to at least one of a positional relationship between colors, a gradation distribution, and a resolution, and
a selecting unit configured to select a choice from multiple choices containing at least two choices of: only position deviation; only density deviation; and both position deviation and density deviation, according to the image characteristic identified by the identification unit,
wherein the image forming apparatus is configured to:
form a mark for detecting the position deviation when the choice of only position deviation is selected by the selecting unit,
form a mark for detecting the density deviation when the choice of only density deviation is selected by the selecting unit, and
form both the mark for detecting the position deviation and the mark for detecting the density deviation when the choice of both position deviation and density deviation is selected by the selecting unit,
wherein the positional relationship between colors is a relationship specified according to at least one of an overlap ratio between colors and an adjacency ratio between colors, and
wherein when the adjacency ratio between colors identified by the identification unit is larger than a threshold value, the selecting unit selects a choice containing the position deviation.

2. The image forming system according to claim 1,
wherein when the overlap ratio between colors identified by the identification unit is larger than a threshold value, the selecting unit selects the choice of both position deviation and density deviation.

3. The image forming system according to claim 1, further comprising:
a determination unit configured to determine whether image quality has deteriorated,
wherein when the determination unit determines that the image quality has not deteriorated, the image forming apparatus does not form a mark, even if it is determined to form the mark according to the selection by the selecting unit.

4. An image forming system according to claim 1,
wherein when the selecting unit does not select a choice including position deviation or density deviation according to each of the image characteristics identified by the identification unit, the image forming apparatus does not form a mark.

5. An image forming apparatus comprising:
an obtaining unit configured to form a mark for detecting at least one of a position deviation and a density deviation and obtain a correction amount by detecting the mark,
an identification unit configured to perform identification of an image characteristic of an image to be printed according to at least one of a positional relationship between colors, a gradation distribution, and a resolution, and
a selecting unit configured to select a choice from multiple choices containing at least two choices of: only position deviation; only density deviation; and both position deviation and density deviation, according to the image characteristic identified by the identification unit,
wherein the obtaining unit is configured to:
form a mark for detecting the position deviation when the choice of only position deviation is selected by the selecting unit,
form a mark for detecting the density deviation when the choice of only density deviation is selected by the selecting unit, and
form both the mark for detecting the position deviation and the mark for detecting the density deviation when the choice of both position deviation and density deviation is selected by the selecting unit,
wherein the positional relationship between colors is a relationship specified according to at least one of an overlap ratio between colors and an adjacency ratio between colors, and
wherein when the adjacency ratio between colors identified by the identification unit is larger than a threshold value, the selecting unit selects a choice containing the position deviation.

6. The image forming system according to claim 5,
wherein when the overlap ratio between colors identified by the identification unit is larger than a threshold value, the selecting unit selects the choice of both position deviation and density deviation.

7. The image forming system according to claim 5, further comprising:
a determination unit configured to determine whether image quality has deteriorated,
wherein when the determination unit determines that the image quality has not deteriorated, the image forming apparatus does not form a mark, even if it is determined to form the mark according to the selection by the selecting unit.

8. An image forming system according to claim 5,
wherein when the selecting unit does not select a choice including position deviation or density deviation according to each of the image characteristics identified by the identification unit, the image forming apparatus does not form a mark.

9. An image forming system including an image forming apparatus configured to form a mark for detecting at least one of a position deviation and a density deviation and obtain a correction amount by detecting the mark, the image forming system comprising:
an identification unit configured to identify an image characteristic of an image to be printed according to at least one of a positional relationship between colors, a gradation distribution, and a resolution, and
a selecting unit configured to select a choice from multiple choices containing at least two choices of: only position deviation; only density deviation; and both position deviation and density deviation, according to the image characteristic identified by the identification unit, wherein the image forming apparatus is configured to:
form a mark for detecting the position deviation when the choice of only position deviation is selected by the selecting unit,
form a mark for detecting the density deviation when the choice of only density deviation is selected by the selecting unit, and
form both the mark for detecting the position deviation and the mark for detecting the density deviation when the choice of both position deviation and density deviation is selected by the selecting unit,
wherein the positional relationship between colors is a relationship specified according to at least one of an overlap ratio between colors and an adjacency ratio between colors,
wherein the selection unit is configured to select a choice for each color, and
wherein when the overlap ratio between a set of colors is larger than a first threshold value or the adjacency ratio between the set of colors is larger than a second threshold value, the selecting unit selects a choice respectively for the set of colors.

10. The image forming system according to claim 9, wherein when the overlap ratio between colors identified by the identification unit is larger than a threshold value, the selecting unit selects the choice of both position deviation and density deviation.

11. The image forming system according to claim 9, further comprising:
a determination unit configured to determine whether image quality has deteriorated,
wherein when the determination unit determines that the image quality has not deteriorated, the image forming apparatus does not form a mark, even if it is determined to form the mark according to the selection by the selecting unit.

12. An image forming system according to claim 9, wherein when the selecting unit does not select a choice including position deviation or density deviation according to each of the image characteristics identified by the identification unit, the image forming apparatus does not form a mark.

13. An image forming apparatus comprising:
an obtaining unit configured to form a mark for detecting at least one of a position deviation and a density deviation and obtain a correction amount by detecting the mark,
an identification unit configured to perform identification of an image characteristic of an image to be printed according to at least one of a positional relationship between colors, a gradation distribution, and a resolution, and
a selecting unit configured to select a choice from multiple choices containing at least two choices of: only position deviation; only density deviation; and both position deviation and density deviation, according to the image characteristic identified by the identification unit,
wherein the obtaining unit is configured to:
form a mark for detecting the position deviation when the choice of only position deviation is selected by the selecting unit,
form a mark for detecting the density deviation when the choice of only density deviation is selected by the selecting unit, and
form both the mark for detecting the position deviation and the mark for detecting the density deviation when the choice of both position deviation and density deviation is selected by the selecting unit,
wherein the positional relationship between colors is a relationship specified according to at least one of an overlap ratio between colors and an adjacency ratio between colors,
wherein the selection unit is configured to select a choice for each color, and
wherein when the overlap ratio between a set of colors is larger than a first threshold value or the adjacency ratio between the set of colors is larger than a second threshold value, the selecting unit selects a choice respectively for the set of colors.

14. The image forming system according to claim 13, wherein when the overlap ratio between colors identified by the identification unit is larger than a threshold value, the selecting unit selects the choice of both position deviation and density deviation.

15. The image forming system according to claim 13, further comprising:
a determination unit configured to determine whether image quality has deteriorated,
wherein when the determination unit determines that the image quality has not deteriorated, the image forming apparatus does not form a mark, even if it is determined to form the mark according to the selection by the selecting unit.

16. An image forming system according to claim 13, wherein when the selecting unit does not select a choice including position deviation or density deviation according to each of the image characteristics identified by the identification unit, the image forming apparatus does not form a mark.

* * * * *